(12) United States Patent
Eigler et al.

(10) Patent No.: US 7,125,163 B2
(45) Date of Patent: Oct. 24, 2006

(54) SIMPLE HIGH ACCURACY HIGH ENERGY CALORIMETER

(75) Inventors: Lynne C. Eigler, Simi Valley, CA (US);
Yan S. Tam, Oak Park, CA (US);
Youssef Kohanzadeh, Beverly Hills, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/720,650

(22) Filed: Nov. 24, 2003

(65) Prior Publication Data

US 2005/0111519 A1 May 26, 2005

(51) Int. Cl.
*G01K 17/00* (2006.01)
*G01J 5/00* (2006.01)
*G01N 25/20* (2006.01)

(52) U.S. Cl. .................. 374/31; 374/121; 374/1; 436/147; 422/51

(58) Field of Classification Search ............ 374/10–12, 374/29, 31–35, 120, 121, 1; 436/147; 422/51
See application file for complete search history.

(56) References Cited

U.S. PATENT DOCUMENTS

| | | | | |
|---|---|---|---|---|
| 3,033,985 A * | 5/1962 | Petree | ................... | 250/336.1 |
| 3,034,355 A * | 5/1962 | Butler | ................... | 250/338.1 |
| 3,170,117 A * | 2/1965 | Berning et al. | ............. | 324/106 |
| 3,394,258 A * | 7/1968 | Schleiger et al. | ........ | 250/336.1 |
| 3,508,056 A * | 4/1970 | Fricke | ................... | 250/336.1 |
| 3,665,762 A * | 5/1972 | Domen | ................... | 374/31 |
| 3,813,937 A * | 6/1974 | Fletcher et al. | ............. | 374/34 |
| 4,037,470 A * | 7/1977 | Mock et al. | ................ | 374/32 |
| 4,178,800 A * | 12/1979 | Thomann | ................. | 374/33 |
| 4,185,497 A * | 1/1980 | Decker et al. | ............... | 374/32 |
| 4,522,511 A * | 6/1985 | Zimmerer | .................. | 374/32 |
| 4,687,342 A * | 8/1987 | Betzler et al. | ............... | 374/32 |
| 4,765,749 A * | 8/1988 | Bourgade et al. | ............. | 374/32 |
| 4,848,922 A * | 7/1989 | Chow | ........................... | 374/31 |
| 4,865,446 A * | 9/1989 | Inoue et al. | ................. | 356/216 |
| 4,993,842 A * | 2/1991 | Morimoto et al. | ............ | 374/39 |
| 5,186,540 A * | 2/1993 | Walsh et al. | ................. | 374/32 |
| 5,876,118 A * | 3/1999 | Vogel | .......................... | 374/11 |
| 6,239,432 B1 * | 5/2001 | Parsons | .................. | 250/338.1 |
| 6,513,994 B1 * | 2/2003 | DiGiovanni et al. | .......... | 385/95 |
| 6,523,998 B1 * | 2/2003 | Danley et al. | ................ | 374/12 |
| 6,572,263 B1 * | 6/2003 | Refalo et al. | ................. | 374/31 |
| 6,762,418 B1 * | 7/2004 | Lambert et al. | ........ | 250/455.11 |
| 2003/0099276 A1* | 5/2003 | Argenti | ...................... | 374/121 |

* cited by examiner

*Primary Examiner*—Gail Verbitsky
(74) *Attorney, Agent, or Firm*—Robert R. Richardson, P.S.

(57) ABSTRACT

An exemplary calorimeter includes a body configured to capture radiation generated by a source of the radiation, such as without limitation a laser, and absorb energy from the captured radiation. The calorimeter is simple to manufacture, operate, and maintain and is compact, highly accurate, able to withstand high power beams, and self-calibrating. NIST traceable electrical wires are used for the measurement. No fluids are used during measurements of the input radiation. A simple built in fluid or gaseous cooling system may be used post-measurement to reset the calorimeter temperature back to ambient for repeated measurement capability.

30 Claims, 8 Drawing Sheets

SIMPLE HIGH ACCURACY HIGH ENERGY CALORIMETER

RELATED APPLICATION

This patent application is related to a concurrently-filed U.S. patent application Ser. No. 10/720,772 entitled "High Performance System and Method For Capturing and Absorbing Radiation", the contents of which are hereby incorporated by reference.

FIELD OF THE INVENTION

The present invention relates generally to measuring energy and, more specifically, to measuring energy of radiation.

BACKGROUND OF THE INVENTION

Many modern devices, such as high-energy lasers and high powered-lamps like solar simulator lamps, are capable of putting out high levels of energy in the form of radiation. In certain circumstances, it is desirable to capture and absorb all or part of the output beam of such devices. For example, capturing a portion of the output beam may be desirable when the full output of the device provides too much energy for a desired application. Whether capturing all or part of a beam, if such a device simply captures and absorbs the output energy it is referred to as a beam dump.

In other applications, it may be desirable to capture the output energy in order to measure the output level of the device. Such a measurement may be used to verify a manufacturer's claimed output levels for a device or to verify the performance of new devices and designs. In this case, the radiation capturing, absorbing, and measuring device is used as a calorimeter or power meter.

The body of the calorimeter captures and absorbs the radiation, and causes the temperature of the body to rise. Precise knowledge of the thermal capacitance of the body allows the user to correlate the temperature rise of the calorimeter body to the energy absorbed. Thus, an accurate measurement of the temperature rise of the calorimeter body yields the energy content of the radiation. Care must be taken that the heat loss of the body due to conductive, convective, and radiative cooling is minimized and/or well characterized. In order to make an accurate measurement of the energy in the input radiation, the calorimeter must be capable of surviving the radiation (which may be high power) and must absorb substantially all of the input energy.

Most currently available calorimeters must be cooled to survive high power radiation. Cooling prevents damage to the calorimeter. Cooling also resets the calorimeter to a condition in which the calorimeter is ready to make further measurements.

In most currently known calorimeters that are designed for high energy beam measurements, cooling and measuring are both effected by water that is pumped through channels in the body of the calorimeter. Energy, in the form of heat, is transferred from the body of the calorimeter to the water, thereby heating the water and subsequently cooling the body of the calorimeter. A precision thermometer of some type measures the temperature rise of the water and a flowmeter with substantial accuracy measures the flow rate of the water flowing through the channels of the calorimeter. The temperature rise of the water together with the measured flow rate of the water is used to approximate the energy absorbed by the calorimeter body.

However, currently known calorimeters that use water to measure the temperature change of the body include drawbacks. For example, in an attempt to accurately measure substantially all of the energy, the surface area available for heat transfer between the water and the calorimeter body is desired to be large. In order to accomplish this, numerous intricate water channels are machined into the body of the calorimeter. This increases surface area for heat transfer from the body of the calorimeter to the water, but this also introduces a pressure drop in the water flow because of constriction of the channels. Therefore, a high pressure pump is used to pump water through the numerous intricate channels. The high pressure pump itself is expensive.

Because the water channels are usually small and intricate, it is desirable to keep the channels free of corrosion and contamination. Corrosion and contamination within the channels can reduce the amount of heat transferred to the water or prevent water flow by blocking the channels. However, maintaining water chemistry within desirable limits to reduce contamination and corrosion introduces further costs because water chemistry maintenance is extremely labor-intensive. Moreover, deionized (DI) water is used as the cooling liquid and is treated with fungicide to further reduce corrosion. Use of DI water and fungicide increases costs even further. Further, if channel blockages become severe enough, there may be areas of the calorimeter that experience restricted water flow, thereby causing inaccurate measurement and/or elevated local temperatures at which the equipment may fail.

Inaccuracies in measurements are also introduced by pumping high-pressure water through intricate channels. For example, water is subject to self-heating due to the friction of the water being pumped at high pressure through the intricate channels. This unintended self-heating of the water results in a temperature rise in the water that is not caused by the input radiation and therefore is a source of inaccuracy in the measurement of input radiation.

Inaccuracies in measurement of water flow rates also cause inaccuracies in measurements of the input radiation. For example, when water is forced under high pressure to flow through the calorimeter body, it can set up turbulence in the flow that will introduce false readings in the flow meter.

Furthermore, there is some energy left in the calorimeter body that is not transferred to the water and therefore is not measured by the thermometer. This residual energy will then introduce inaccuracies in the measurement of the total energy of the radiation source.

As a result, there is an unmet need in the art for a high energy calorimeter that is able to withstand high power radiation, accurately measures substantially all of the energy of the radiation, and is inexpensive to fabricate, operate, and maintain.

SUMMARY OF THE INVENTION

The present invention provides a high energy calorimeter that is able to withstand high power radiation, accurately measures substantially all of the energy of the radiation, and is inexpensive to fabricate, operate, and maintain. Advantageously, embodiments of the present invention directly sense temperature of a body of the calorimeter over a substantial portion of the body of the calorimeter. Embodiments of the calorimeter include a thermal isolation system to isolate the body from the surrounding environment. As a result, accuracy of measurements is improved over currently known calorimeters. Further, embodiments of the present invention do not require cooling during measurements, do not use water to make the measurement, and yet are able to survive high power radiation. Therefore, the present invention avoids the inherent inaccuracies of a water-based system and the costs associated with such systems. If post-measurement cooling is desired, a simple liquid or gaseous system may be used to cool embodiments of the present invention.

According to an embodiment of the present invention, an exemplary calorimeter includes a body configured to capture radiation generated by a source of the radiation, such as without limitation a laser, and absorb substantially all the energy of the captured radiation. An accurately-measured value of thermal capacitance is determined for the body. A temperature sensor system is attached in thermal communication with the body, and the temperature sensor system is configured to detect temperature changes of a substantial portion of the body. The absorption of the captured radiation by the body causes the temperature changes. Accordingly, the absorbed energy of the captured radiation can be readily calculated using the measured temperature rise and the measured thermal capacitance of the body.

According to an aspect of the present invention, the temperature sensor includes wire with electrical resistance that varies with temperature, and the wire is attached in thermal communication with the body. The thermal characteristic of the wire is traceable to the National Institute for Standards and Technology (NIST).

According to another aspect of the present invention, the calorimeter body includes a post-measurement cooling system. A plurality of relatively large, simple channels is defined in thermal communication within the interior of the body, and the plurality of channels is connectable to a source of coolant. The coolant may include gaseous nitrogen or other readily available and inexpensive gases, or readily available liquids such as water. If desired, the cooling system may be used post-measurement to lower the calorimeter body's temperature (which was elevated by the absorbed radiation).

According to another aspect of the present invention, the calorimeter is equipped with electrical heaters that are used for calibration of the device. Using the electrical heaters, a known amount of energy is deposited into the body of the calorimeter and the resultant temperature rise is then measured using the resistance wires. Thereby, the actual thermal capacitance can then be determined. In this way, the device has a built-in and rapid calibration system.

According to another aspect of the present invention, the calorimeter thermal isolation system substantially isolates the calorimeter body from the surrounding environment by using low thermal conductivity materials to mount and to insulate the body. Advantageously, these materials limit absorption of ambient environmental thermal energy by the body and leakage by the body of the captured energy, thereby helping to ensure that the measurement of the temperature rise is substantially affected only by the desired input radiation.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
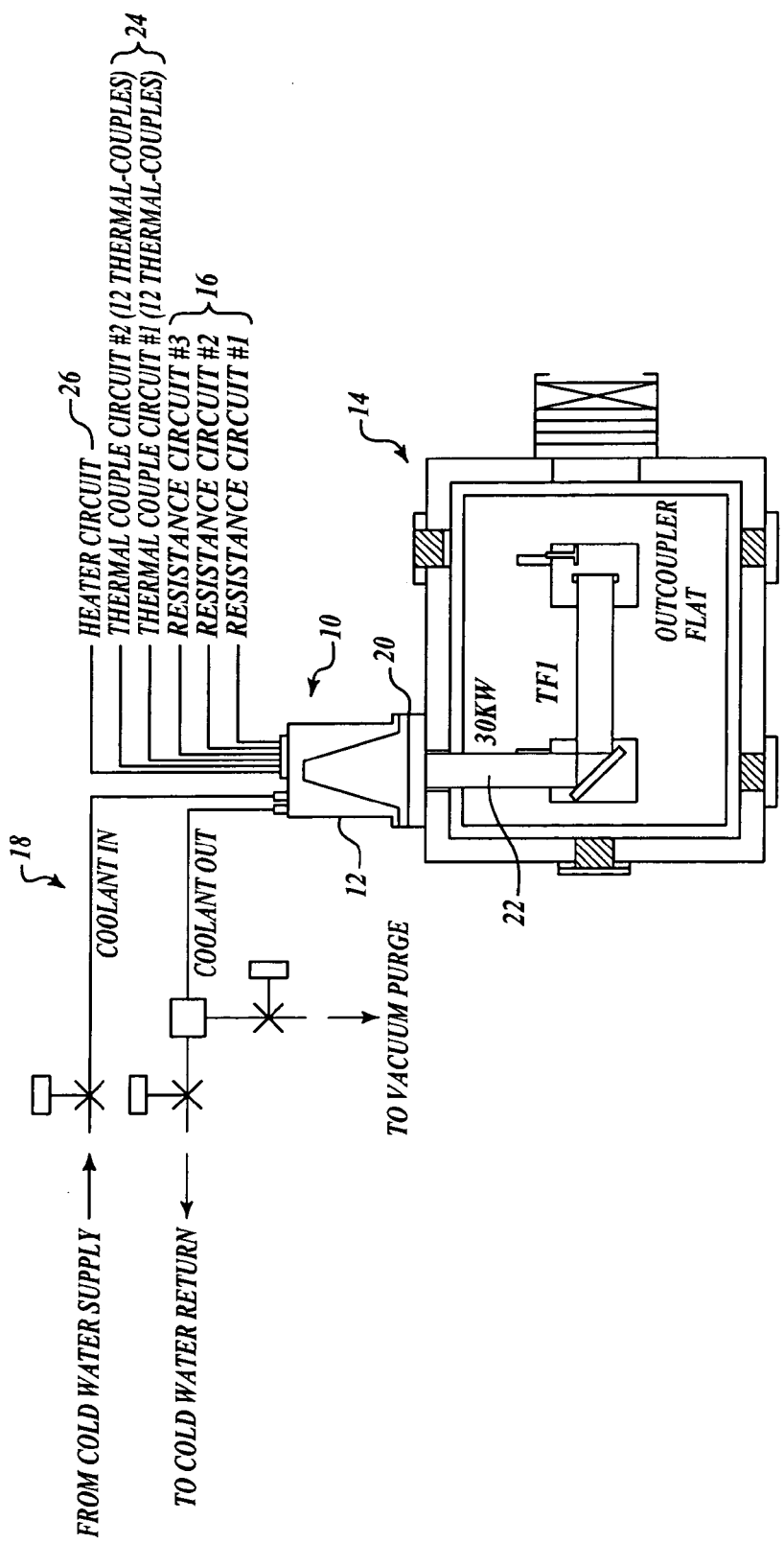
FIG. 1 is a schematic diagram of a calorimeter and interconnections according to an embodiment of the present invention.

By way of overview and referring to FIG. 1, an exemplary high energy calorimeter 10 is able to withstand high power radiation 22, accurately measures substantially all of the energy of the radiation 22, and is inexpensive to fabricate, operate, and maintain. According to an exemplary embodiment of the present invention, the calorimeter 10 includes a body 12 configured to capture radiation 22 generated by a source 14 of the radiation 22, such as without limitation a laser, and absorb energy from the captured radiation 22. A temperature sensor system 16 is attached in thermal communication with the body 12, and the temperature sensor system 16 is configured to detect temperature changes of a substantial portion of the body 12. The absorption of the captured radiation 22 by the body 12 causes the temperature changes. A liquid or gaseous cooling system 18 is configured to provide post-measurement cooling of the body 12 from temperatures elevated due to absorption of the captured radiation 22. A secondary temperature sensor system 24 is configured to provide thermal equilibrium state status of a substantial portion of the body 12. Further, a heater circuit 26 is configured to provide a precision source of electrical calibration for the high energy calorimeter 10. Details of embodiments of the present invention will now be set forth below.

Figure 2:
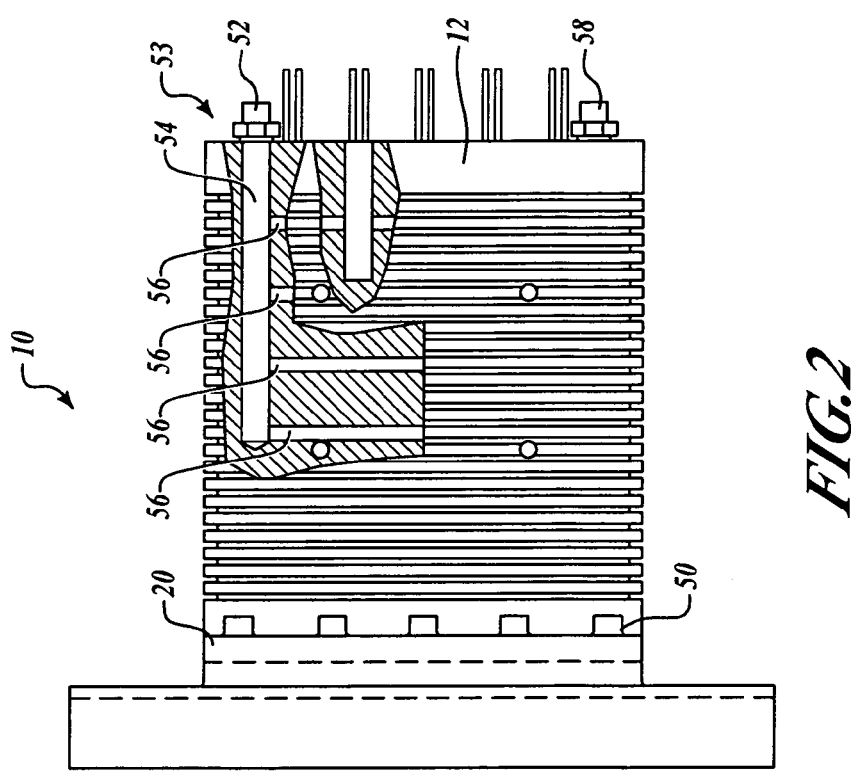
FIG. 2 is a plan view with a partial cutaway of an exemplary calorimeter according to an embodiment of the present invention.

Referring now to FIGS. 1 and 2, the body 12 is designed to admit and absorb the radiation 22 from the source 14. The radiation 22 may be any acceptable form of radiation, such as without limitation a laser beam. In one exemplary embodiment given by way without limitation, the radiation 22 may be a laser beam with a power range from around 10 KW to around 40 KW, a wavelength of around 1.315 microns and an intensity profile of around 0.5 to around 2.0 peak-to-average. Laser beam mode size can range from around 4 cm by around 4 cm to around 4 cm by around 12 cm. Duration of the laser beam may be around 2 seconds minimum, around 5 seconds nominal, and around 10 seconds maximum.

The body 12, sometimes referred to as a beam dump, may be any acceptable beam dump configured to capture and absorb substantially all of the incoming high energy radiation 22. Beam dumps are well known in the art and, as a result, details of the geometry internal to the body 12 are not necessary for an understanding of the present invention. However, details of an exemplary beam dump for which the present invention is well suited are set forth in concurrently-filed U.S. patent application Ser. No. 10/720,722 entitled "High Performance System and Method For Capturing and Absorbing Radiation", the contents of which are hereby incorporated by reference.

In one presently preferred embodiment, the body 12 is a copper body. However, it will be appreciated that the body 12 may be made of other high thermal conductivity materials, as desired, such as without limitation aluminum.

In an exemplary embodiment, the calorimeter 10 includes a thermal isolation system. In one presently preferred embodiment, a plurality of fasteners 50 extends through a low thermal conductivity clamp 20 of the body 12 and attaches the body 12 to a flange 57. Given by way of nonlimiting example, in one presently preferred embodiment the clamp 20 is constructed of glass filled PEEK (PolyEtherEtherKetone). It will be appreciated that any material with sufficiently low thermal conductivity and sufficient mechanical strength may be used. In one presently preferred embodiment, a thermal isolator plate 55 is placed between the body 12 and the flange 57. Without limitation the isolator plate may be constructed of glass reinforced epoxy resin. In one exemplary embodiment, the flange 57 allows mounting support of the calorimeter 10. Further, a presently preferred embodiment includes low thermal conductivity tubes 61 for transfer of coolant used during post-measurement cooling of the calorimeter body 12. In one embodiment, the coolant tube suitably is constructed of glass filled epoxy resin. Advantageously, the low thermal conductivity clamp 20, the thermal isolator plate 55, and the low thermal conductivity coolant tubes 61 provide conductive thermal isolation of the calorimeter 12.

Further, the thermal isolation system includes material to insulate the calorimeter body 12 from the surrounding environment. Given by way of nonlimiting example, in one presently preferred embodiment, the insulation 59 is fabricated from Polyimide foam with an outer covering that reflects radiation. The insulation 59 suitably is designed with structural rigidity such that at installation an airgap 63 is provided between the calorimeter body 12 and the insulation 59. Advantageously, the insulation 59 and airgap 63 provide radiative and convective isolation of the calorimeter body 12.

Figure 2A:
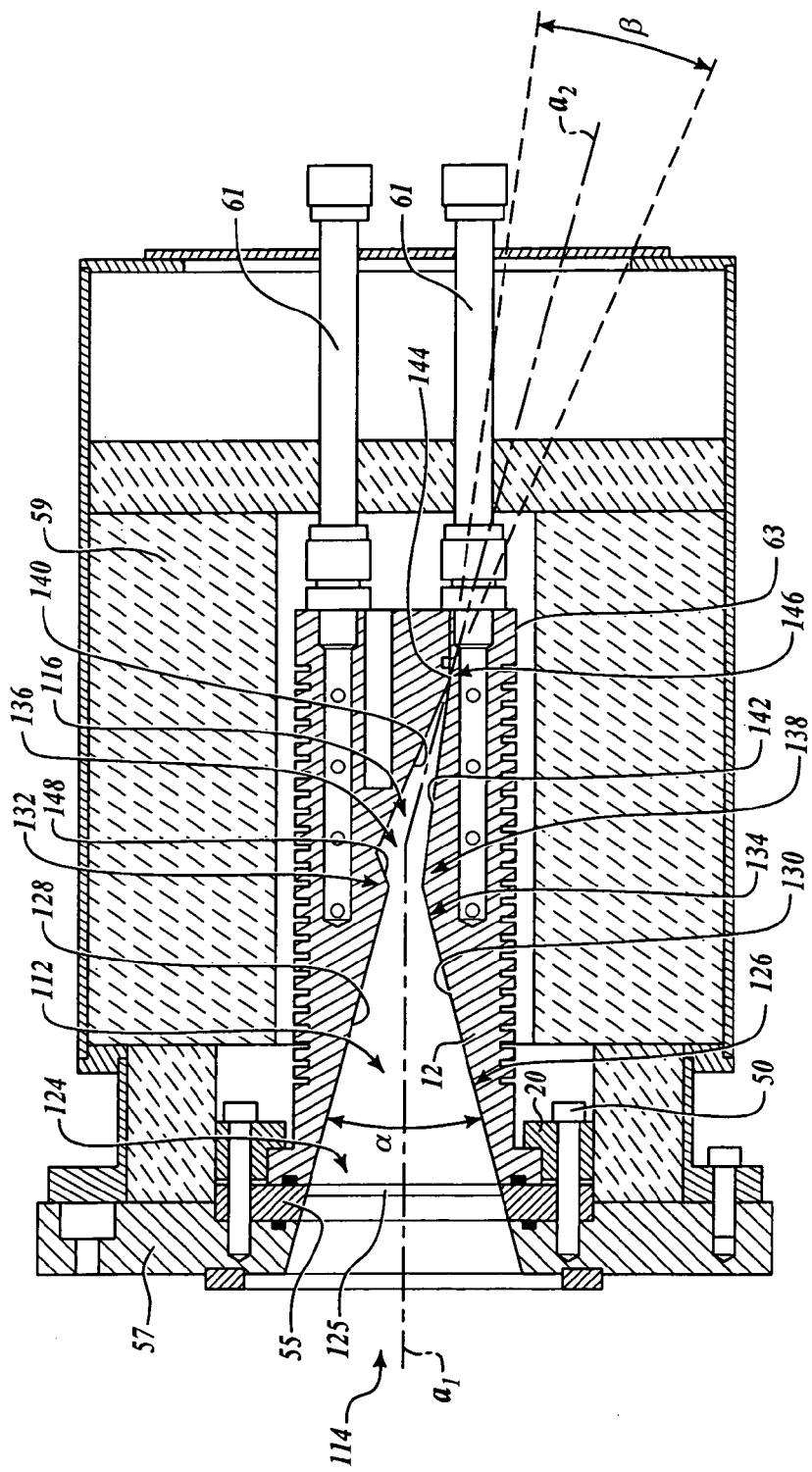
FIG. 2A is a cut-away view of an exemplary calorimeter assembly according to an embodiment of the present invention.
Figure 2B:
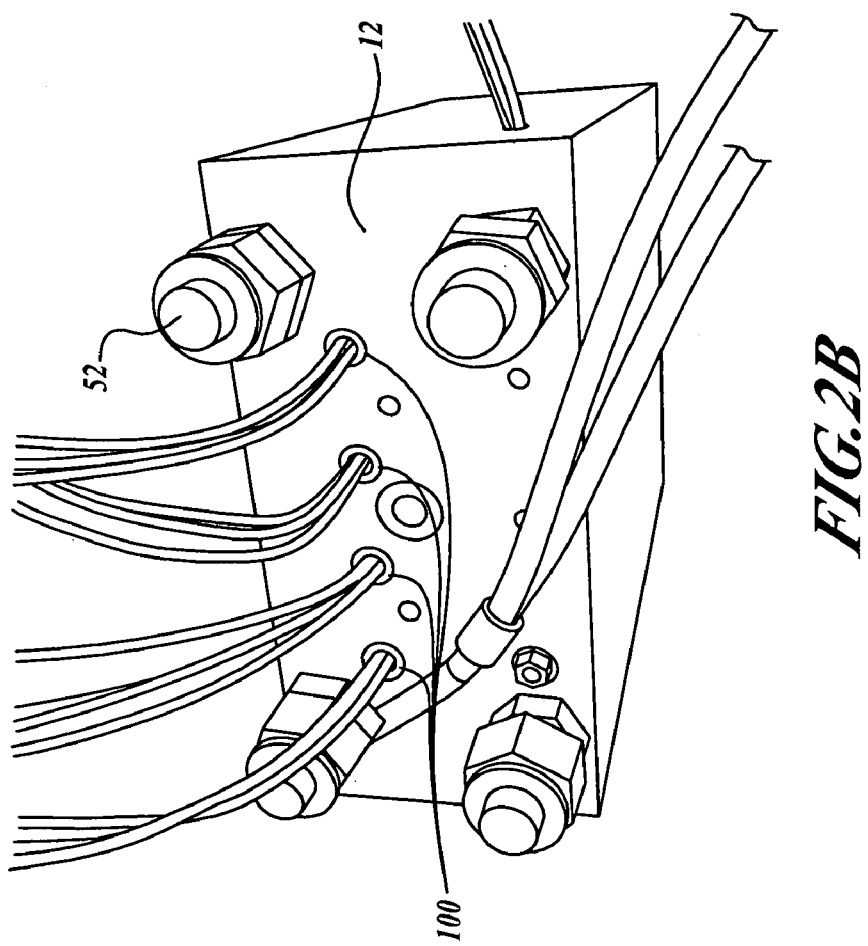
FIG. 2B is a perspective view of an exterior of a body of an exemplary calorimeter.

Referring now to FIG. 2A, details of an exemplary, non-limiting example of the body 12 will now be explained. A first chamber 112 has a first axis $a_1$ and is configured to receive a beam 114 of radiation. The first chamber 112 is further configured to attenuate the beam 114 and direct a portion of the beam 114 into a second chamber 116. The portion of the beam 114 directed into the second chamber 116 may range up to 100% of the beam. The second chamber 116 has a second axis $a_2$ that is not collinear with the first axis $a_1$. The second chamber 116 is configured to receive at least a portion of the beam 114. The second chamber 116 is further configured to further attenuate at least a portion of the beam 114, such that the two chambers 112 and 116 together absorb or otherwise capture substantially all of the radiation.

The first chamber 112 defines an opening 124 at a first end 126 of the first chamber 112. The opening 124 defines an aperture 125 in the body 118 that advantageously is sized to admit the entire beam 114. In one presently preferred embodiment, the opening 124 is larger than a footprint of the beam 114.

First and second faces 128 and 130 extend from the first end 126 to a throat 132 at a second end 134 of the first chamber 112. The first and second faces 128 and 130 define an angle α between them. The first and second faces 128 and 130 narrow at the angle α along the axis $a_1$ from the first end 126 to the throat 132 at the second end 134. The angle α suitably has any value as desired for a particular application. However, given by way of non-limiting example, in one embodiment the angle α has a value of around 28°. In another exemplary embodiment, given by way of non-limiting example the angle α suitably may have a value of around 32°. While it is emphasized that the angle α may be selected to have any angle as desired, the non-limiting values given above for the angle α have been determined to attenuate a prescribed amount of energy of the beam 14 while minimizing back-scatter and back-reflection.

The second chamber 116 defines an opening 136 at a first end 138. The opening 136 is configured to admit a portion of the beam 114 through the throat 132. It will be appreciated that portions of the beam 114 that reflect off the first or second face 128 and 130 may also be admitted through the opening 136. Third and fourth faces 140 and 142 define an angle β therebetween. The third and fourth faces 140 and 142 narrow at the angle β along the axis $a_2$ to a vertex 144 at a second end 146. Similar to the angle α, the angle β suitably can have any value as desired. In one present embodiment, the angle β advantageously has a value of around 15°. It has been determined that a value of around 15°, in concert with values of either around 28° or around 32° for the angle α, advantageously attenuates substantially all of the energy of the beam 114 and minimizes local heating, back-scatter and back-reflections. However, it is emphasized that the angle β may have any value as desired for a particular application.

If desired, the second chamber 116 may optionally include additional faces such as a fifth face 148. If provided, the fifth face 148 may extend from the end of the first face 128 at the second end 134 of the first chamber 112 to the end of the third face 140 at the first end 138 of the second chamber 116. If desired, the fifth face 148 may be provided to provide a greater amount of non-collinearity between the axes $\alpha_1$ and $\alpha_2$. Advantageously, within certain limits, increasing the amount of non-collinearity between the axis $\alpha_1$ and $\alpha_2$ mitigates even further any amount of back-scatter or back-reflection.

Referring now to FIGS. 1 and 2A, one exemplary embodiment of the calorimeter 10 includes an integral calibration system including a built-in electrical heating system 26. A plurality of electrical heaters 100 are used as part of the calibration process. By supplying a known amount of electrical power to the heaters 100 for a known period of time a known amount of energy is deposited in the calorimeter body 12. Subsequently, a measurement of the change in the temperature of the body 12 is performed by the temperature sensor system 16 and the heat capacitance may be calculated. The calorimeter system thus allows direct determination and verification of its own thermal capacitance. Given by way of nonlimiting example, in one preferred embodiment the heaters 100 are Chromalox CIR-20252-120 cartridge heaters.

In one presently preferred embodiment, the body 12 can absorb radiation within a dynamic range of between around 20 Kilojoules (KJ) and around 400 KJ and does not require any cooling of the body 12 during the measurement process. Because the body 12 of the calorimeter 10 will capture and absorb substantially all of the energy of the radiation 22, the body 12 may be cooled post-measurement to allow for subsequent measurements. If the input energy is high enough, successive runs without either active cooling or sufficient time for passive cooling may drive the bulk temperature of the device 10 above safe operating temperatures of the materials or pose safety hazards to personnel.

Advantageously, according to a preferred embodiment of the present invention, the cooling system 18 uses a gaseous coolant. However, it will be appreciated that the cooling system 18 may use other cooling mediums, as desired, such as without limitation deionized water. The gaseous coolant suitably may be used only to cool the body 12 post-measurement, that is, after capture and measurement of the radiation 22, and is not used as either part of or during the measurement process. Advantageously, embodiments of the present invention use the mass of the body 12, and in one presently preferred embodiment the copper mass, as the thermal mass to store the captured energy of the radiation 22 for subsequent measurement. Advantageously and as a result, the present invention avoids the inaccuracies and costs inherent in most currently known calorimeters that use high-pressure water or other liquids pumped through numerous constrictive channels as part of the measurement system and for cooling.

In one exemplary embodiment, the gaseous coolant includes gaseous Nitrogen ($GN_2$). Given by way of nonlimiting example, the GN2 may be provided at around 66 psig at a mass flow rate of around 5.2 lbm/min. This configuration resets the body 12 in about 45 minutes or less to a cooled temperature sufficient for the calorimeter 10 to begin another measurement. However, it will be appreciated that other gaseous coolants, such as inert gases like helium, may be used as desired for a particular application. It will be further appreciated that liquids may also be used to cool the calorimeter body post-measurement. However, care should be taken to ensure that all residual moisture is removed from coolant channels 56 and headers 54 prior to performing new measurements (see FIG. 2).

In one exemplary embodiment, the inlet ports 52 at a first end 53 of the body 12 are arranged to be coupled to receive an acceptable coolant gas, such as $GN_2$, from a supply (not shown) of the coolant gas. An inlet header 54 extends a finite distance, such as about half-way, from the first end 53 into the body 12. It will be appreciated that the inlet header 54 may extend any distance into the body 12 for a desired application. A longer length of the inlet header 54 may provide for more surface area of the body 12 in thermal communication with the coolant gas. However, the length of the inlet header 54 may depend upon the selected attenuation geometry within the body 12.

The inlet header 54 supplies the coolant gas to a plurality of coolant channels 56 that extend throughout the body 12. In one exemplary embodiment, the coolant channels 56 extend substantially normally from the inlet header 54 across substantially the width of the body 12. It will be appreciated, again, that longer lengths and/or higher quantities of the coolant channels 56 may provide for more surface area of the body 12 in thermal communication with the coolant gas.

The coolant channels 56 connect to an outlet header (not shown) that is similar to the inlet header 54. The outlet header terminates at an outlet port 58. The outlet port 58 is arranged to be connected to a reservoir (not shown) for dumping expended coolant gas received from the calorimeter 10.

Figure 5:
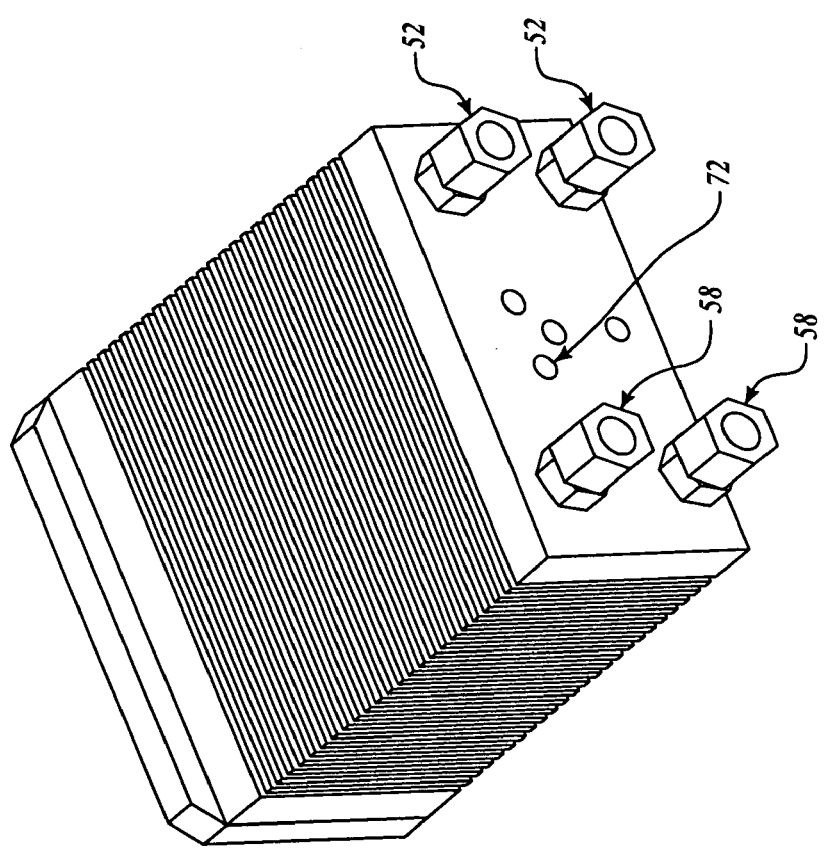
FIG. 5 is another perspective view showing an aft view of the calorimeter of FIG. 2.

Similarly, referring now to FIG. 5, a second set of coolant headers 54 and coolant channels 56, an outlet header (not shown), an inlet port 52, and an outlet port 58 are configured for the lower half of the body 12.

Figure 3:
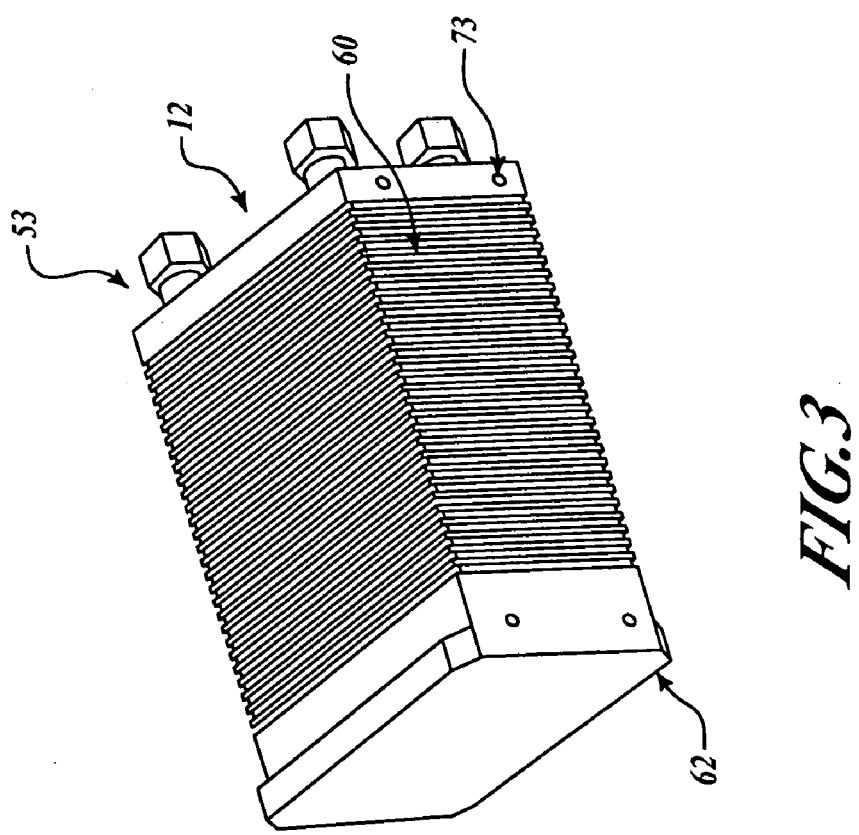
FIG. 3 is a perspective view of a forward portion of the calorimeter of FIG. 2.
Figure 4:
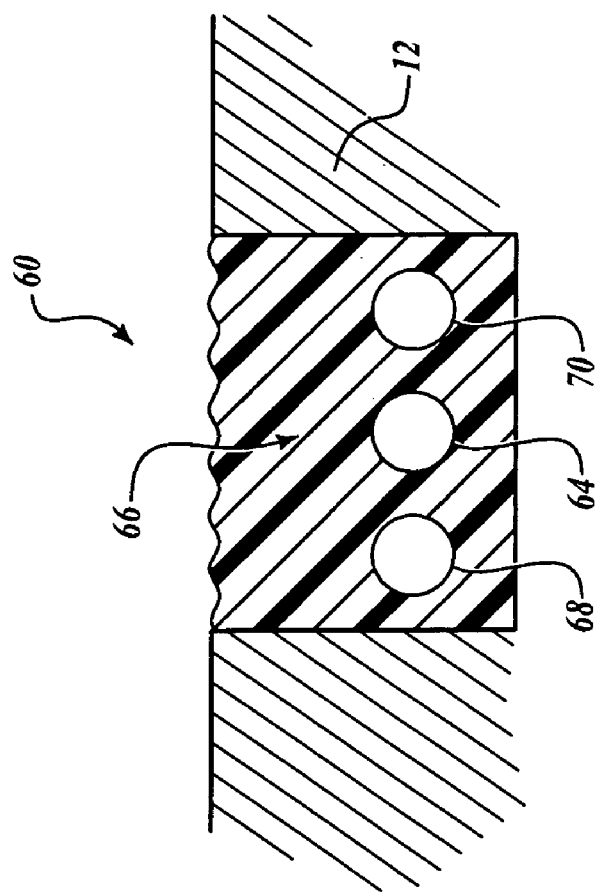
FIG. 4 is a section view of a detail of an exemplary temperature sensor.

Advantageously, embodiments of the present invention directly sense temperature of the body 12 of the calorimeter 10 over a substantial portion of the body 12. Referring now to FIGS. 3 and 4, the exterior of the body 12 contains a continuous helical groove 60 that extends substantially the length of the body 12 between the first end 53 and a second end 62 of the body 12. As shown in FIG. 4, the helical groove 60 has a depth that is deep enough to implant the temperature sensor system 16 (discussed in detail below) in the interior of the body 12 to improve heat transfer from the body 12 to wires 64, 68, and 70 (discussed in detail below) and to protect the wires. On the other hand, the depth of the helical groove 60 is not so deep as to endanger integrity of the temperature sensor system 16 due to local heating. As such, depth of the helical groove 60 may be selected as desired for a particular application. Because the helical groove 60 extends substantially the length of the body 12, the temperature sensor system 16 (implanted within the helical groove 60) advantageously may directly sense temperature of the body 12 along a substantial portion of the body 12.

Referring to FIG. 4, details will be set forth regarding the temperature sensor system 16. In one exemplary embodiment, the temperature sensor system 16 is a continuous wire 64 implanted within the helical groove 60. Advantageously, resistance of the wire 64 varies proportionally with temperature of the wire 64. That is, as temperature of the wire 64 increases, resistance of the wire 64 decreases. In one exemplary, nonlimiting embodiment, the wire 64 suitably is polyamide coated copper resistance wire, has a gauge of 30 AWG. Advantageously, the polyamide coating provides electrical isolation of the wire 64 from the body 12. Therefore the resistance measurement is isolated to the length of the wire 64. The wire is around 468 inches long in order to extend throughout the length of the helical groove 60. However, the wire 64 may have any length as desired for a particular application. It will be appreciated that the wire 64 extends substantially the length of body 12 and length of wire wrapped around the body 12 is a substantial portion of total wire length. The temperature dependence of the resistance of wires 64, 68, and 70 are NIST traceable.

The wire 64 is encapsulated within the helical groove 60 with a potting compound 66, such as without limitation aluminum filled epoxy or the like. Advantageously, the potting compound 66 has a high coefficient of thermal conductivity. As a result, the wire 64 is in thermal communication with the body 12 along a substantial portion of the body 12. Given by way of nonlimiting example, this gives rise to a response time from beginning of irradiation to registering a change in temperature on the wire 64 of around 2 seconds. Further, temperature measurements can achieve equilibrium in less than around 5 minutes. For redundancy purposes, if desired, wires 68 and 70 may also be provided along with the wire 64 in the helical groove 60. If provided, the wires 68 and 70 suitably may be made of the same material as the wire 64 and are also encapsulated by the potting compound 66 in the helical groove 60.

Referring now to FIG. 5, in one embodiment a plurality of ports 72 are provided for heaters (not shown), such as without limitation 5 KW electrical heating elements like NiChrome wire. The electrical heating elements raise the temperature of the body 12 to a predetermined temperature as desired. Advantageously, the temperature sensor system 16 may be calibrated by comparing the temperature of the body 12 as determined by the temperature sensor system 16 against the expected temperature rise due to the electrical heaters.

Referring briefly back to FIG. 3, thermocouples 73 may be provided throughout the body 12 as another component of the temperature sensor system 16. The thermocouples 73 generate an output signal proportional to temperature in a known manner. The thermocouples 73 measure local temperatures, thereby allowing determination of whether or not the calorimeter body 12 has reached thermal equilibrium. The thermocouples 73, along with the temperature sensing system 16, also permit an operator to determine if the body 12 has cooled sufficiently after use to irradiate the body 12 again. In one exemplary embodiment, the thermocouples 73 have a temperature range from about 10 degrees Celsius to about 50 degrees Celsius.

Figure 6:
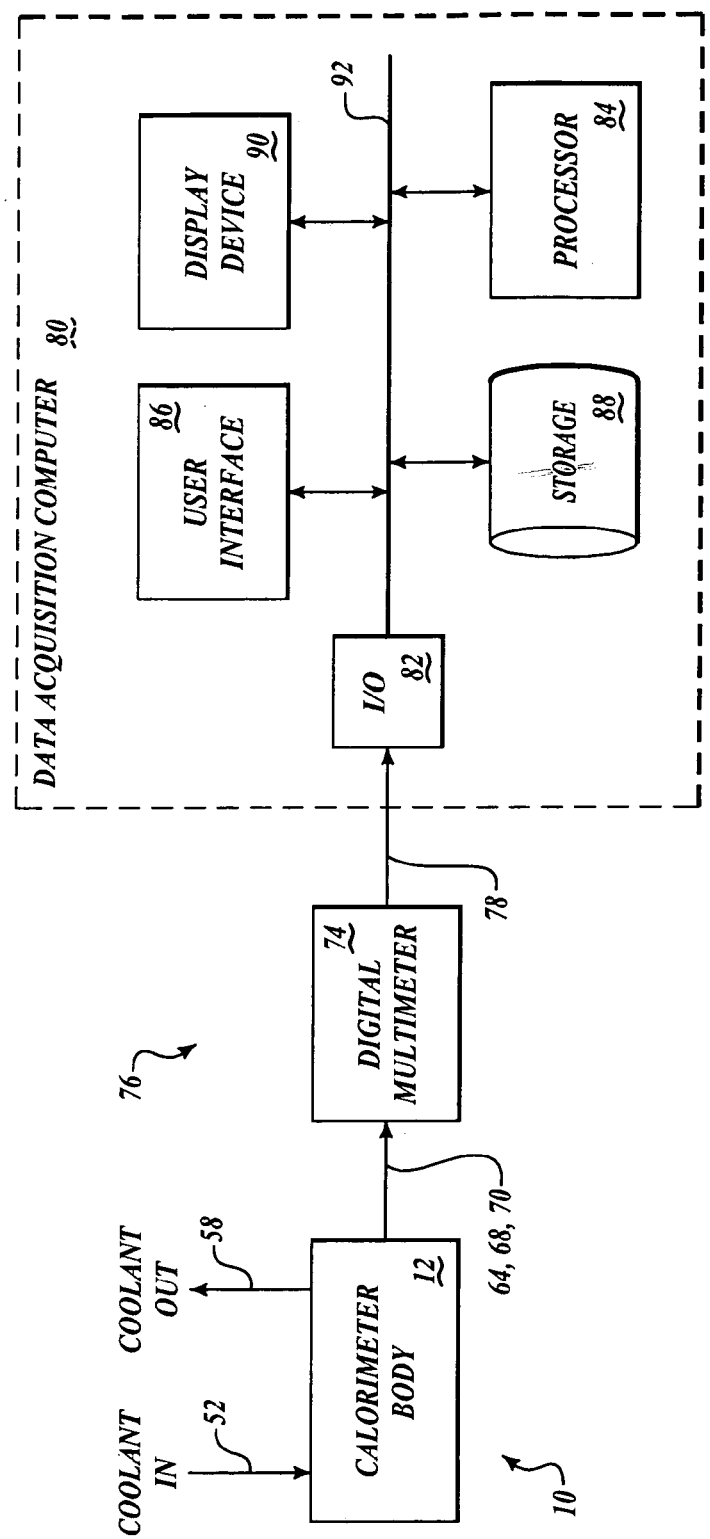
FIG. 6 is a block diagram of a calorimeter and data analysis system according to an embodiment of the present invention.

Referring now to FIG. 6, a system 76 determines energy output of the source radiation 22. An ohmmeter 74, such as a digital multimeter, is coupled to the wire 64 and, if provided, the wires 68 and 70. The ohmmeter 74 has a resolution sufficient to detect changes in resistance of the wire 64. In one embodiment, the digital multimeter 74 suitably is a 5½ digit digital multimeter with a resolution of around 1 milli ohm and preferably is a 6½ digit digital multimeter with a resolution of around 100 micro ohm. The digital multimeter 74 measures the resistance of the wire 64 and, if provided, the wires 68 and 70, in a known manner and generates an output signal 78.

A data acquisition computer 80 processes the output signal 78. The data acquisition computer 80 suitably includes any computer that is well known in the art. The output signal 78 is received and conditioned by an input interface 82, such as without limitation an RS-232 interface. A system bus 92 interconnects a processor 84, a user interface 86, magnetic or optical storage media 88, and a display device 90. The processor 84 may be any acceptable processor, such as without limitation a Pentium® or Celeron® processor available from the Intel Corporation or a processor for a personal data assistant (PDA) operating on a Palm® operating system or the like. The user interface 86 may be a keyboard, mouse, trackball, PDA-type stylus, or the like. The magnetic or optical storage 88 includes any acceptable memory or storage device, such as without limitation any type of random access memory (RAM) or read-only memory (ROM), flash memory, a compact disc or digital video disc, or the like. Advantageously, storage 88 includes a mapping of changes in temperature (ΔT) of the body 12 with the energy absorbed. The display device 90 may be any suitable monitor or screen. Components of the computer 80 are well known and a detailed explanation of their construction and operation is not necessary for an understanding of the present invention.

The system 76 operates as follows. As discussed above, the calorimeter 10 receives the radiation 22 from the source 14 (FIG. 1) and absorbs the radiation 22. As also discussed above, energy from the radiation is transferred to the body 12 in the form of heat. As a result, temperature of the body 12 rises.

As temperature of the body 12 rises, heat is conducted through the potting compound 66 to the wire 64 and, if provided, the wires 68 and 70. As a result, temperature of the wire 64 and, if provided the wires 68 and 70, rises and wire resistance lowers The digital multimeter 74 determines wire resistance and provides resistance readings to the data acquisition computer 80 via the signal 78. The processor 84 converts resistance readings provided by the signal 78 to temperature. The processor 84 determines ΔT by subtracting the initial temperature (at the beginning of or before irradiating the body 12) from the temperature indicated during irradiation of the body 12. The processor 84 retrieves from storage 88 the mapping of energy versus ΔT. The energy that correlates to the determined ΔT is divided by the time of irradiation to determine power of the radiation in units as desired, such as without limitation Kilo watts.

After irradiation of the body 12 and the completion of measurements, cooling gas may be supplied by the cooling system 18. Energy in the form of heat is transferred from the body 12 to the cooling gas as the cooling gas passes through the inlet header 54, the coolant channels 56, and the outlet port 58. Coolant gas that has exited the outlet port 58 is dumped as desired in any known manner.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A calorimeter comprising:
a body configured to admit and capture radiation, the body being further configured to absorb energy from the captured radiation, the body including:
a first chamber having a first axis and being configured to receive a beam of radiation, the first chamber being further configured to absorb the beam of radiation; and
a second chamber having a second axis that is not collinear with the first axis, the second chamber being configured to receive at least a portion of the beam of radiation, the second chamber being further configured to further absorb at least the portion of the beam of radiation, such that substantially all of the radiation is absorbed;
a temperature sensor attached over a substantial portion of the body in thermal communication with a substantial portion of the body, the temperature sensor being configured to detect a change in temperature of a substantial portion of the body responsive to absorption of the captured radiation; and
a cooling system configured to cool the body from temperatures elevated responsive to absorption of the captured radiation.

2. The calorimeter of claim 1, wherein the temperature sensor includes wire having resistance that varies with temperature, the wire being attached in thermal communication with the body.

3. The calorimeter of claim 2, wherein the wire includes enamel coated copper wire.

4. The calorimeter of claim 2, further comprising a detector configured to detect resistance of the wire.

5. The calorimeter of claim 4, wherein the detector includes a digital multimeter.

6. The calorimeter of claim 4, further comprising a processor including a first component configured to convert detected resistance of the wire to temperature of the body.

7. The calorimeter of claim 6, wherein the processor further includes a second component configured to convert the temperature of the body to power of the admitted radiation.

8. The calorimeter of claim 7, wherein the second component is further configured to correlate the temperature of the body to energy of the radiation absorbed in the body and to divide over time the energy of the radiation to determine the power of the radiation.

9. The calorimeter of claim 1, wherein the temperature sensor further includes a plurality of thermocouples in thermal communication with the body.

10. The calorimeter of claim 1, wherein the cooling system is non-aqueous.

11. The calorimeter of claim 10, wherein the non-aqueous cooling system includes a gaseous cooling system including a plurality of channels defined in thermal communication within an interior of the body, the plurality of channels being connectable to a source of cooling gas.

12. The calorimeter of claim 11, wherein the cooling gas includes gaseous nitrogen.

13. The calorimeter of claim 1, wherein the cooling system is aqueous.

14. The calorimeter of claim 1, further comprising a plurality of electrical heaters configured to introduce a predetermined amount of energy into the body for calibrating thermal capacitance of the body.

15. A calorimeter comprising:
a body configured to admit and capture radiation, the body being further configured to absorb energy from the captured radiation, the body including:
a first chamber having a first axis and being configured to receive a beam of radiation, the first chamber being further configured to absorb the beam of radiation; and
a second chamber having a second axis that is not collinear with the first axis, the second chamber being configured to receive at least a portion of the beam of radiation, the second chamber being further configured to further absorb at least the portion of the beam of radiation, such that substantially all of the radiation is absorbed;
a wire having resistance that varies with temperature, the wire being attached over a substantial portion of the body in thermal communication with a substantial portion of the body, the wire being configured to detect a change in temperature of a substantial portion of the body responsive to absorption of the captured radiation;
a multimeter coupled to detect resistance of the wire;
a processor coupled to receive detected resistance of the wire, the processor having a first component configured to convert detected resistance of the wire to temperature of the body; and
a cooling system configured to cool the body from temperatures elevated responsive to absorption of the captured radiation.

16. The calorimeter of claim 15, wherein the processor further includes a second component configured to convert the temperature of the body to power of the admitted radiation.

17. The calorimeter of claim 16, wherein the second component is further configured to correlate the temperature of the body to energy of the radiation absorbed in the body and to divide over time the energy of the radiation to determine the power of the radiation.

18. The calorimeter of claim 15, wherein the temperature sensor further includes a plurality of thermocouples in thermal communication with the body.

19. The calorimeter of claim 15, wherein the cooling system is non-aqueous.

20. The calorimeter of claim 19, wherein the non-aqueous cooling system includes a gaseous cooling system including a plurality of channels defined in thermal connection within an interior of the body.

21. The calorimeter of claim 20, wherein cooling gas includes gaseous nitrogen.

22. The calorimeter of claim 15, wherein the cooling system is aqueous.

23. The calorimeter of claim 15, wherein the multimeter includes a digital multimeter.

24. The calorimeter of claim 15, wherein the wire includes enamel coated copper wire.

25. The calorimeter of claim 15, further comprising a plurality of electrical heaters configured to introduce a predetermined amount of energy into the body for calibrating thermal capacitance of the body.

26. A calorimeter comprising:
a body configured to admit and capture radiation, the body being further configured to absorb energy from the captured radiation, the body including:
a first chamber having a first axis and being configured to receive a beam of radiation, the first chamber being further configured to absorb the beam of radiation; and
a second chamber having a second axis that is not collinear with the first axis, the second chamber being configured to receive at least a portion of the beam of radiation, the second chamber being further configured to further absorb at least the portion of the beam of radiation, such that substantially all of the radiation is absorbed;
a temperature sensor attached over a substantial portion of the body in thermal communication with a substantial portion of the body, the temperature sensor being configured to detect a change in temperature of a substantial portion of the body responsive to absorption of the captured radiation; and
a cooling system configured to cool the body from temperatures elevated responsive to absorption of the captured radiation, the cooling system including a plurality of channels defined in thermal communication within an interior of the body, the plurality of channels being connectable to a source of cooling fluid.

27. The calorimeter of claim 26, wherein the cooling system is non-aqueous.

28. The calorimeter of claim 27, wherein the cooling fluid includes an inert gas.

29. The calorimeter of claim 28, wherein the inert gas includes gaseous nitrogen.

30. The calorimeter of claim 26, wherein the cooling system is aqueous.

* * * * *